United States Patent [19]

Hibbard

[11] Patent Number: 4,669,838
[45] Date of Patent: Jun. 2, 1987

[54] ROLL FILM DOCUMENT IMAGE STORAGE AND RETRIEVAL APPARATUS AND SYSTEM

[75] Inventor: Earl R. Hibbard, Berkeley, Calif.

[73] Assignee: Infoquest Corporation, San Jose, Calif.

[21] Appl. No.: 687,206

[22] Filed: Dec. 28, 1984

[51] Int. Cl.⁴ ............................................. G03B 23/12
[52] U.S. Cl. .................................. 353/26 A; 353/27 A
[58] Field of Search ..................... 353/26 R, 26 A, 25, 353/27 R, 27 A, 122; 250/557, 569, 570

[56] References Cited

U.S. PATENT DOCUMENTS

| | | | |
|---|---|---|---|
| 3,963,336 | 6/1976 | Haning et al. | 353/27 A X |
| 4,139,901 | 2/1979 | Ganske et al. | 364/900 |
| 4,160,269 | 7/1979 | Endicott | 350/570 |
| 4,174,890 | 11/1979 | Johnson et al. | 353/27 A X |
| 4,254,329 | 3/1981 | Gokey et al. | 353/27 A X |

FOREIGN PATENT DOCUMENTS 0055920 4/1983 Japan .............................. 353/27 A Primary Examiner—Harry N. Haroian
Attorney, Agent, or Firm—Flehr, Hohbach, Test, Albritton & Herbert

[57] ABSTRACT

Roll film document image storage and retrieval apparatus comprising a film transport having a supply reel and a takeup reel with a roll of film carried by the reels, the film having images thereon. A motor drive is provided for driving the film between the supply and takeup reels in forward and reverse directions. An optical image sensor is provided which is disposed adjacent the film between the supply and takeup reels. An image locater is provided for causing relative movement between the optical image sensing means and the film so that a specific image carrier by the film can be viewed. The image sensor senses a plurality of images simultaneously and provides an analog output. A processor is provided for processing the analog output to provide a digital output which can be utilized for providing a visual image.

10 Claims, 8 Drawing Figures

FIG.—1

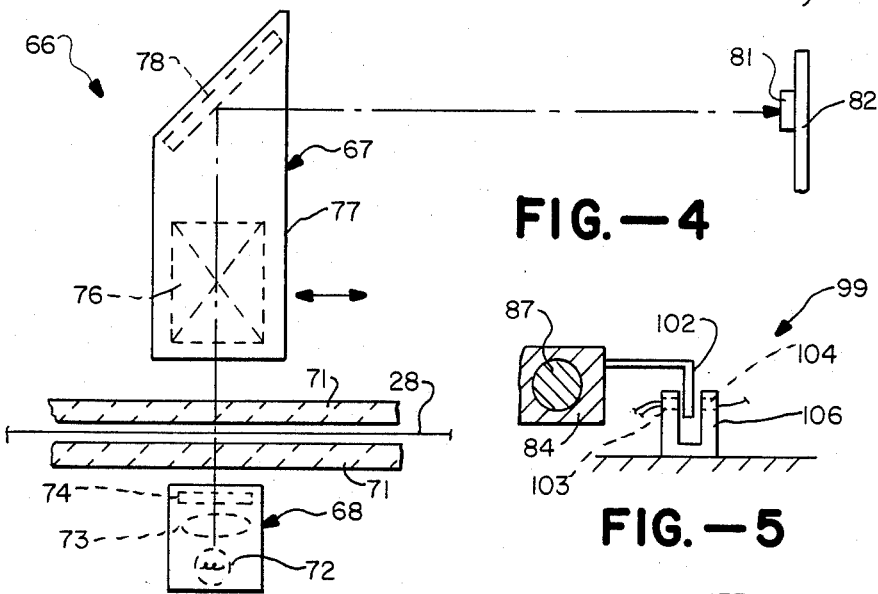
FIG.—4
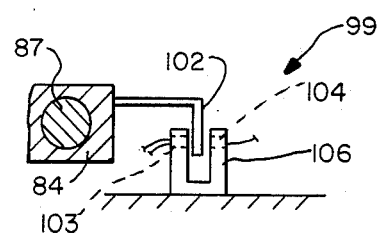
FIG.—5
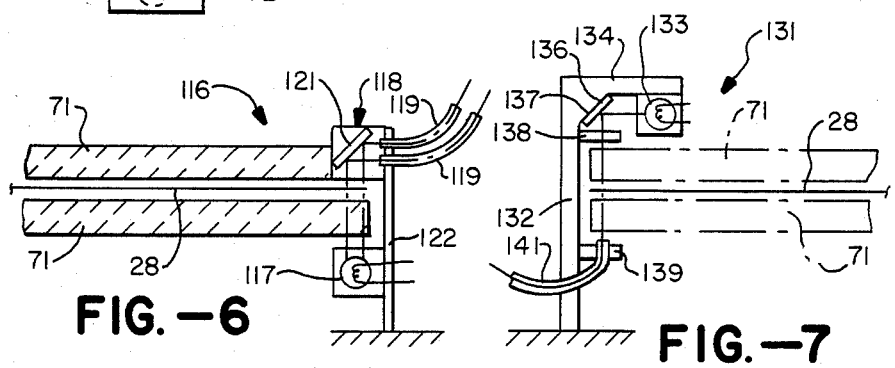
FIG.—6
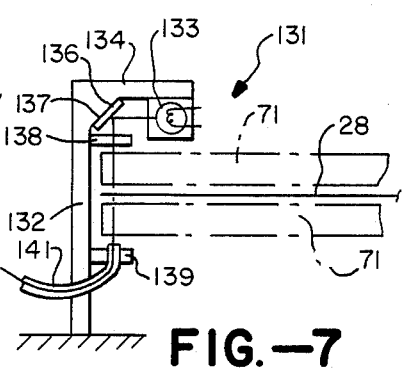
FIG.—7
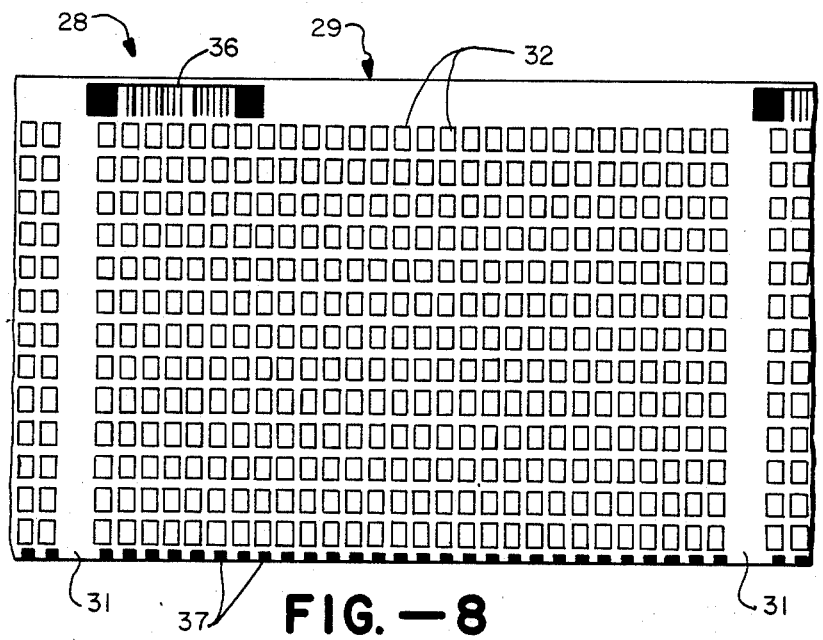
FIG.—8

ROLL FILM DOCUMENT IMAGE STORAGE AND RETRIEVAL APPARATUS AND SYSTEM

This invention relates to a roll film document image storage and retrieval apparatus and system and more particularly, one which utilizes 105 millimeter film for storing the images and one which provides digitized video information for display or for making hard copy from the stored images on the 105 millimeter film.

Document image storage and retrieval systems have heretofore been provided as, for example as disclosed in U.S. Pat. No. 4,139,901. Such systems, however, have certain limitations as, for example, they do not provide digitized video information. They also do not have large storage capabilities such as that provided by roll film storage. There is therefore a need for a new and improved apparatus and system using roll film storage.

In general, it is an object of the present invention to provide a roll film document storage image and retrieval apparatus and system under computer control having a high capacity with rapid scanning and retrieval of images to provide digitized video information for distribution to remote terminals.

Another object of the invention is to provide an apparatus and system of the above character which utilizes 105 millimeter film.

Another object of the invention is to provide an apparatus and system of the above character in which the digitized video information can be utilized for providing a video display or for making hard copy.

Another object of the invention is to provide an apparatus and system of the above character which can store information from a large number of documents.

Another object of the invention is to provide an apparatus and system of the above character which is microprocessor controlled.

Another object of the invention is to provide an apparatus and system of the above character in which a particularly novel system is utilized for identifying the film to facilitate registration of a particular image on the film with an optical lens system.

Another object of the invention is to provide an apparatus and system of the above character which is under computer control and which provides fully automated reliable high capacity scanning and retrieval of image stored on a continuous roll of film.

Another object of the invention is to provide an apparatus and system of the above character which permits quick electronic selection of digitized images.

Another object of the invention is to provide an apparatus and system of the above character which allows access to a data base capable of containing the images of millions of documents.

Another object of the invention is to provide an apparatus and system of the above character in which the retrieved image can be viewed on a video screen to verify the selection.

Additional objects and features of the invention will appear from the following description in which the preferred embodiments are set forth in detail in conjunction with the accompanying drawings.

FIG. 4 is an enlarged cross sectional view taken along the line 4—4 of FIG. 3.

FIG. 5 is an enlarged view looking along the line 5—5 of FIG. 3.

FIG. 6 is an enlarged view looking along the line 6—6 of FIG. 3.

FIG. 7 is an enlarged view looking along the line 7—7 of FIG. 3.

FIG. 8 is a plan view of a portion of the roll film with images thereon as shown in the apparatus of FIGS. 1–6.

In general, the roll film document storage and retrieval apparatus and system is comprised of at least one film transport having a supply reel and a takeup reel with a roll of film being carried by the reels. Motive means is provided for driving the supply and takeup reels of the transport. An optical assembly is provided for viewing images on the roll film. Means is provided for causing relative movement between the film and the optical assembly whereby a selected optical image on the film is viewed by the optical assembly. An image sensor is provided for converting the optical image into a digitized video signal. Microprocessor controlled means is provided for controlling the access to the optical images carried by the film.

Figure 1:
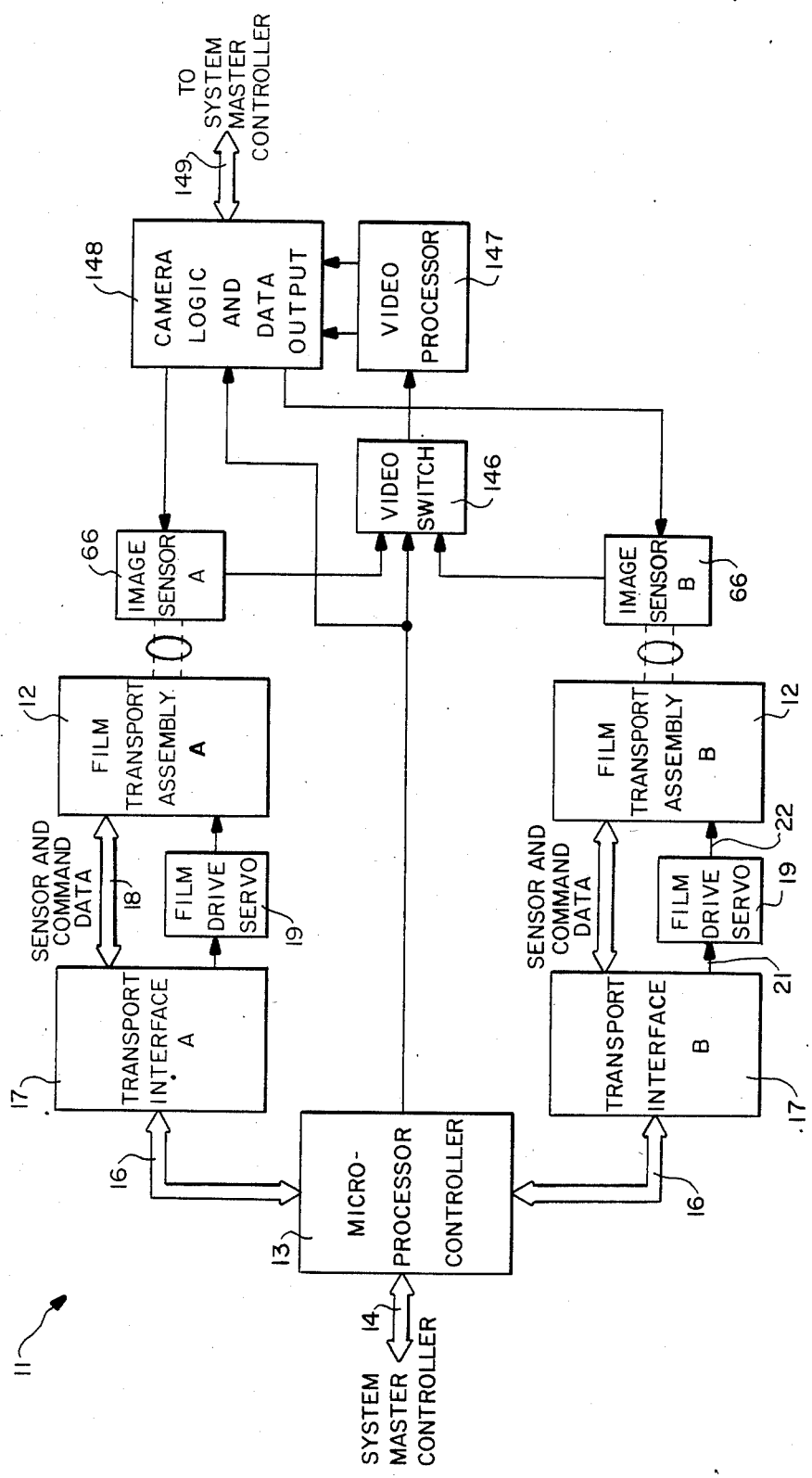
FIG. 1 is a block diagram of a roll film document storage and retrieval apparatus and system incorporating the present invention.

The roll film document image storage and retrieval apparatus 11 and system is shown in block diagram form in FIG. 1 and can be characterized as an image storage unit. This image storage unit 11 is of the type which is adapted to be housed in a cabinet or rack (not shown) which is to be incorporated in an apparatus and system of the type described in co-pending application Ser. No. 687,207, filed Dec. 28, 1984.

The image storage unit 11, as shown in FIG. 1, consists of first and second film storage assemblies 12 also identified as film transport assembly A and film transport assembly B. These transport assemblies A and B can be housed in separate drawers (not shown) mounted in a rack (not shown). The electronics associated with the transport assemblies A and B can also be mounted in a separate drawer mounted in the same rack.

As shown in FIG. 1, this electronics consists of a microprocessor controller 13 which is connected by a conventional RS 232A data cable 14 to a system master controller of the type disclosed in co-pending application Ser. No. 687,207, filed Dec. 28, 1984.

The microprocessor controller 13 is provided with a Z80 base and is utilized for controlling the two film transport assemblies A and B and the scanning of images therefrom as hereinafter described. The microprocessor controller 13 is of a conventional type and is operated by software tailored for this particular application. The microprocessor controller 13 is connected by data buses or cables 16 to transport interfaces 17, also identified as A and B. The transport interfaces A and B are connected by data buses 18 to the film transports 12. The transport interfaces 17 are of a conventional type and serve as A to D converters and condition the signals from the film transport and supply them to the microprocessor 13. Also they translate commands from the microprocessor 13 into active analog commands for the film transport assemblies 12. Film drive servoes 19 are provided and are connected through cables 21 and 22 between the transport interfaces 17 and the film transport assemblies 12.

Figures 2, 3:
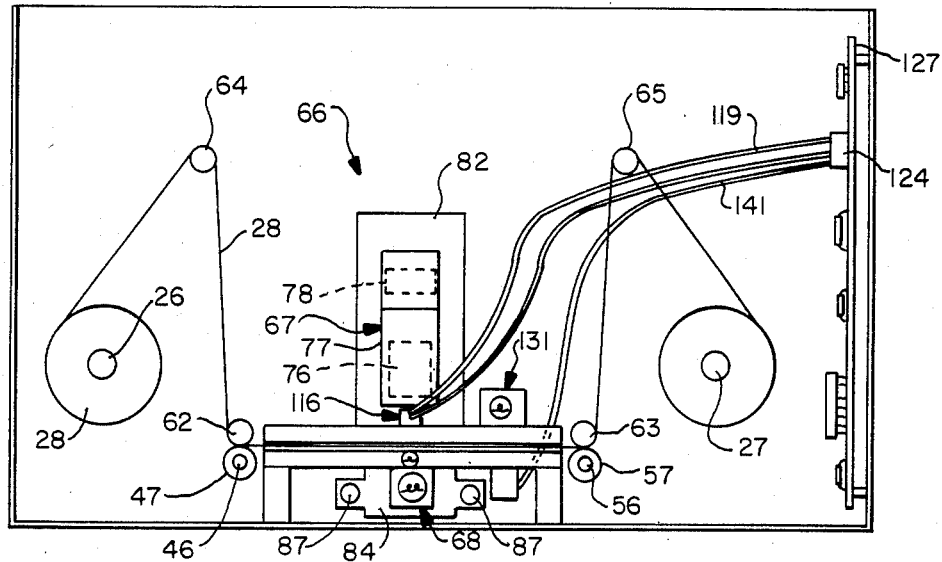
FIG. 2 is a side elevational view of a portion of the apparatus showing the manner in which the roll film is scanned and read.
FIG. 3 is a plan view of the apparatus shown in FIG. 2.

One of the film transport assemblies 12 is shown in FIG. 2. As shown therein, it consists of two reels 26 and 27 which are spaced apart and parallel and which are adapted to carry roll 28 of microfilm. The roll 28 can be mounted on one of the reels as, for example, reel 26 which can be called a supply reel and connected to the other reel 27 which can be identified as a takeup reel. The roll 28 of microfilm preferably has a width of 105 millimeters so that it can carry a large number of document images as hereinafter described. For example, it can have a length up to 1000 feet. With a length of 150 feet it has a capacity of 200,000 images. The roll 28 is provided with a plurality of spaced apart areas which can be called fiche 29 (see FIG. 8). Each fiche 29 extends across the width of the film and extends along the length of the film a suitable distance, as for example, 148 millimeters or approximately six inches. Thus it can be seen that the fiche 39 extend longitudinally of the film 28. The fiche 29 are separated from each other by inter-record or inter-fiche gaps 31. A total of 364 images 32 are provided on each fiche 29 and are arranged in parallel spaced apart rows and columns with 13 horizontal rows being provided extending longitudinally of the fiche and 28 vertical columns extending transversely of the fiche. The images 32 typically can be spaced transversely of the fiche approximately 7.21 millimeters center to center and spaced horizontally of the fiche approximately 5.0 millimeters. Each image 32 has a dimension of approximately 0.2 of an inch wide and 0.24 inches high. Each image is identified by a fiche number and XY coordinates.

Each fiche 29 carries identification means. This identification consists of a bar code 36 which is disposed along the upper left-hand end of one side margin of the film as viewed in FIG. 8. Registration of the fiche 29 in the apparatus is controlled by the use of cut marks 37 disposed along the other side margin of the film 28 and at the bottom of the film as viewed in FIG. 8. The cut marks can be of any suitable size but, for example, can have a size such as three millimeters square and are spaced five millimeters apart center to center and are positioned so that they are in registration with the 28 vertical columns of images 32 in each fiche 29. The positioning of these cut marks 37 makes it possible to precisely position the film 28 on the X-axis or, in other words, longitudinally of the film.

The film 28 is driven in the X direction by a motor 41 which is provided with an output pulley 42 which drives a belt 43. The belt 43 drives a pulley 44 carried by a rotatably mounted shaft 46. The shaft 46 carries a capstan 47 which engages the underside of the film 28. Another pulley 48 is mounted on the shaft 46 and carries a belt 49 which drives another pulley 51. The pulley 51 is mounted on the reel 26 and drives the reel 26. Another pulley 52 is mounted on the shaft 46 and drives a belt 53. The belt 53 drives a pulley 54 mounted upon a rotatably mounted shaft shaft 56. The shaft 56 carries a capstan 57 which also engages the underside of the film 28. Another pulley 58 is mounted on the shaft 56 and drives a belt 59 which drives a pulley 61 mounted on the reel 27. Pinch rollers 62 and 63 are provided which engage the top side of the film 28 and are spring loaded against the film 28 to hold the film 28 against the capstans 47 and 57 with a suitable force as, for example, 8 ounces of force. The pinch rollers 62 and 63 also serve to provide approximately 90° turns for the film 28 after which the film 28 passes over additional rollers 64 and 65 to the rods 26 and 27. The travel of the film 28 between the capstans 47 and 57 is in a horizontal plane as shown particularly in FIG. 2. Thereafter, the film 28 travels in substantially vertical directions towards and away from the pinch rollers 64 and 65. As the film 28 moves from one reel to another and the diameter of the roll of film on the reel decreases or increases, the belt driving the reel will slip to accommodate the change in diameter. By the use of the electronics hereinbefore described, the servo drive motor 41 can be utilized to precisely position the film in an X direction by the use of the cut marks 37 provided on each fiche 29 of the film 28.

Optical means 66 is provided for viewing the images 32 on the film 28 and consists of a framework (not shown) which carries upper and lower assemblies 67 and 68 with one assembly being disposed on the lower side of the film 28 and the assembly 67 being disposed on the upper side of the film 28. The film 28 when it is to be read is clamped between two spaced apart parallel glass platens 71 to hold the film 28 in a precise vertical position between the assembly 67 and 68 when an image is being read from the fiche as hereinafter described. By way of example, the upper platen 71 can remain stationary and the lower platen 71 moved upwardly to clamp the film by the use of suitable electrically controlled means such as a solenoid (not shown).

The light source assembly 68 consists of a lamp 72 of a suitable type such as an incandescent lamp which supplies light through a condensor lens 73. The light from the condensor lens 73 then passes through an optical filter 74. The optical filter 74 serves to limit the spectrum of light reaching the film to center it around approximately 500 nanometers in wavelength. This filter serves to eliminate long wavelengths of light and provides a high resolution image to be captured by the optical system hereinafter described. The filter 74 also permits the use of a diazo film as, for example, a black diazo film. The filter permits the use of such a film because it limits the light to a specific spectral range within the critical spectral range of the diazo film.

It should be pointed out that although it is preferable to utilze black diazo film for copies in the image storage unit 11, in photographing the document from the hard copy, it is preferable to utilize a silver-based film for the master negative. Thereafter the necessary copies in the black diazo film can be made from the silver-based negative.

The glass platens 71 serve to capture the film and hold it stationary for focusing during scanning of the film as hereinafer described. When the film is to be moved, the lower glass platen is dropped down approximately an eighth of an inch to permit film motion. After the film has been moved so that the desired fiche is in position, the platens are then clamped together to hold the film stationary during focusing and scanning.

The projection lens assembly 67 which is positioned on the opposite side of the film on which the light source assembly 68 is positioned consists of a projection lens having a ratio of 4.5:1. The projection lens 76 is mounted in a rectangular housing 77 and directs the image it picks up from the film 28 onto a front surface mirror 78 disposed at a suitable angle as, for example, 45°. The front surface mirror 78 projects the image from the projection lens 76 onto an optical sensing device 81 of a suitable type such as a charge coupled array device (CCD). The sensing assembly 81 is mounted upon a printed circuit (PC) board 82.

The optical system 66 consisting of the projection lens assembly 67 and the light source assembly 68 along with the sensing assembly 81 which carried by the PC board 82 is mounted upon a framework 84 and is supported thereon in the unitary position so that the parts of the optical system have an established relationship between each other. The framework 84 is carried by a Y-drive mechanism 86. The Y-drive mechanism 86 causes the framework 84 to travel in a Y direction or, in other words, transverse of the film 28 and is slidably mounted upon spaced parallel guide rods 87 provided as a part of the image storage unit 11. The Y-drive mechanism 86 includes a lead screw 88 which extends through a nut 89 threaded onto the lead screw and secured to the framework 84 so that as the lead screw 88 is rotated the framework 84 is moved longitudinally of the lead screw. The lead screw is carried by bearings 91. The lead screw 88 is provided with a pulley 92 which is driven by an O-ring belt 93. The O-ring belt 93 is driven by a pulley 94 driven by a servo drive motor 96.

Sensing means 98 is provided for precisely ascertaining the position of the Y-drive means and consists of a vane sensing assembly 99 and a tachometer assembly 101. The vane sensing assembly 99 consists of a vane 102 (see FIG. 5) carried by the framework 84 and moves with the framework 84. The vane position is sensed when it interrupts light from a light source 103 of a suitable type, such as a lighting emitting diode and prevents further transmission of light to a light sensing element 104 in the form of a photo diode. The light source 103 and the light sensing device 104 are carried by stationary support members 106 forming a part of the image storage unit 11.

This vane sensing assembly 99 provides a specific start position index signal to the microprocessor controller 13. Thereafter, the location of the Y-drive mechanism 86 is ascertained by the tachometer means consisting of a tachometer 108. The tachometer is driven by a pulley 109. The pulley 109 is driven by an O-ring belt 111. The belt 111 is driven by another pulley 112 which is also secured to the lead screw 88 and is rotated as the lead screw 88 is rotated. The tachometer 108 provides a suitable number of pulses as, for example, 800 pulses per revolution of the lead screw 88. The image 32 of the fiche 29 has a height of approximately 2200 pulses from the tachometer 108 to thereby provide a precise registration in the Y direction.

Position sensing means 116 is provided for sensing the X or horizontal position of the film 28, by sensing the cut marks 37. The position sensing means 116 consists of a light source 117 positioned on one side of the film 28 along the side margin of the film 28 carrying the cut marks 37. The light source 117 can be in any suitable form such as a light emitting diode. Light sensing means 118 is provided on the other side of the film 28 and takes the form of a pair of fiber optic bundles 119 which are provided with a mirror 121 disposed at an angle of 45° with respect to the longitudinal axis of the bundle. The fiber optic bundles are a suitable distance as for example ⅛ inch. The light emitting diode 117 and the fiber optic bundle 119 are carried by spaced apart stationary member 122 which form a part of the image storage unit 11. The fiber optic bundles 119 are connected to a block 124. The block 124 contains photodiode light sensors 126. The outputs from the light sensors 126 are applied to a printed circuit board 127 which forms a part of the image storage unit 11. The cut mark position sensing means 116 makes it possible to position the film 28 within 0.010 of an inch in the X direction. One of the sensors 126 is used to sense the cut marks and to find the proper column. The other sensor 126 is used to center the cut mark for the column between the two sensors 126. This is accomplished by positioning the cut mark so that it is between the two sensors 126 and does simultaneously form a shadow on both of the sensors.

The Y-position sensing means 98 on the other hand makes it possible to sense the position in the Y direction to within 0.0001 of an inch or better. It is more important to sense the position in the Y direction more accurately than in the X direction because it is desirable to position the scanning of an image very close to the beginning of each image before the scan is commenced.

A bar code sensor 131 is provided for sensing the bar codes 36 which are provided on the other or upper side margin of the film 28. The details of the bar code sensors 131 are shown in FIG. 7. It consists of a pair of stationary support member 132. A light source 133 is carried by a post 134 supported by the member 132. The light source can be of any suitable type such as an incandescent source and its light is directed onto a front surface mirror 136 disposed at a suitable angle as, for example, 45° carried by a mirror support 137 also affixed to the support member 132. The light from the mirror 136 is directed through a filter 138 and is directed through the side margin of the film 28. The light is then adapted to be received by the distal extremity of a fiber optic bundle 141 which is mounted on a post 134 carried by the support member 132. The light sensed by the fiber optical light bundle 141 is sensed by a photodiode sensor 142 also mounted in the block 124 carried by the PC board 127.

The optical image sensing means 66 hereinbefore described is represented by an image sensor block 66 with the one being associated with film transport A being identified as image sensor A and the one associated with film transport B being identified as image sensor B. As shown in FIG. 1, the outputs from the image sensors A and B as well as the output from the microprocessor controller 13 are supplied to a video switch 146. The output from the video switch 146 is supplied to a video processor 147. The output from the video processor 147 is supplied to a camera logic and data output module 148. The output from the microprocessor controller 13 is also supplied to the camera logic and data output module 148. The camera logic and data output module 148 is also connected to the image sensors A and B. The output from the camera logic and data output module 148 is supplied through a RS 422A bus 149 to the system master controller of the type described in co-pending application Ser. No. 687,207, filed Dec. 28, 1986 (File A 40638).

Operation of the roll film document image and retrieval apparatus and system may now be briefly described as follows. Let it be assumed that a roll of film 28 has been placed upon the rolls 26 and 27 and is positioned in the manner shown in FIGS. 2 and 3. Let it be assumed that it is desired to obtain the image of a particular document stored on the film 28. When a system user wants to view a particular document the image identifier is passed to the microprocessor based controller 13. This information is supplied from the system master controller through the bus 14 to the microprocessor controller 13. The system controller will known what the last image that was scanned by the system and would have in it the bar code of the fiche from which the image was obtained. Using this information and the new document image desired, the microprocessor controller 13 will cause the film transport 12 to be actuated by operating the film drive servo 19 to move the film either in a forward or reverse direction.

Assuming that the system master controller knows that the image is on a subsequent fiche, the film 28 will be advanced and the bar code of each fiche as it passes will be reach by the bar code sensor 131 in the manner hereinbefore described. Thus it can be seen that the bar code sensor is utilized to select the desired fiche. As the desired fiche is being neared, the moving film is decelerated until the desired fiche is reached. As soon as the microprocessor controller ascertains that the fiche having the desired bar code has been reached, the microprocessor controller 13 knows this and generates the control commands necessary to select the particular image 32 on the fiche which has been selected. Commands are also supplied to the film drive servo and utilizing the information from the cut mark position sensing means, the desired column is selected and the film 28 is stopped in a position below the projection lens 76. As soon as the motion of the film 28 has been stopped, the microprocessor controller 13 causes operation of the solenoid (not shown) to cause the movement of the glass platens 71 to clamp the film 28 so as to capture the film vertically and hold it stationary for focusing during scanning in a Y or transverse direction. The microprocessor controller 13 knows the position of the Y-drive mechanism 86 from the previous operation. As pointed out previously, the location of the Y-drive mechanism is initially ascertained by the use of the vane sensing assembly 99 in conjunction with the operation the tachometer assembly 101. The Y-drive mechanism is advanced until the entire image 32 has been scanned. The microprocessor controller 13 knows where the images are positioned on the fiche by the first that it knows the dimensions of the image on the fiche and therefore knows that the starting and stopping points for the scanning operation.

The microprocessor controller 13 with respect to the position of the Y-drive mechanism causes the optical image forming means 66 to be positioned at the top of the selected row very close to the beginning of the image to be scanned. Typically, in viewing the images in FIG. 8, this would be very close to the beginning of the upper end of the image. Thus it can be seen that the XY coordinates for the particular image are utilized by the microprocessor controller to position the optical image forming means 66 over the selected image.

Let it be assumed that the image which is to be viewed is in the film transport A. When this is the case, the video switch 146 selects the film transport A and receives the signal from the image sensor A. Assuming that the image has been selected in the manner hereinbefore described and that the optical image forming means 66 is positioned at the top of the image, an entire row of information with respect to the image extending longitudinally of the image is supplied simultaneously to the CCD sensor 81. The system analog output is supplied by the image sensor A to the video switch 146. This analog video signal is supplied to the videoprocessor 147 which is of a conventional type and conditions the analog information for digitizing in terms of making the overall amplitude of the signal constant or making the DC component constant and controlled. In addition there is some image enhancement by signal conditioning and by low pass filtering in the actual digitization of the actual image. This process video information in digital form is now supplied to the camera logic and data output module 148 which supplies the same through the bus 149 to the system master controller.

In a manner well known to those skilled in the art, the information supplied on the bus 149 can be utilized to provide an image of a document recorded in the iamge 32 on the fiche by displaying the same on a high resolution cathode ray tube, or alternatively, the information can be printed directly upon an electrostatic printer. In summary, using the CCD array, the electronic optical image forming means which can be also called a scanning camera digitizes the image and outputs a binary bit stream to the system controller for distribution to a remote high resolution image display terminal. Alternatively the information can be supplied to a suitable plotter such as an electrostatic plotter.

As soon as an image has been scanned, the image storage unit is ready to scan the next image requested. Typically if information being sought is a document having multiple pages, the images will be in sequence on the fiche and they can be scanned sequentially from the fiche. However, if an image is desired from another fiche, this information can be supplied to the microprocessor controller 13 to advance or rewind the film 28 to the desired position by utilizing the bar code sensor assembly 131. The same procedure as hereinbefore described can then be utilized for locating the particular image on the fiche after the fiche has been located.

As soon as an image has been scanned and it is necessary to select an image which is not in the same column, then it is necessary to move the film 28. To accomplish this, the glass platens are moved with respect to each other so that the film 28 is no longer captured between the same. After the film has been moved to the desired position, the glass platens are again moved to capture the film in the manner hereinbefore described.

It is apparent from the foregoing that there has been provided a roll film image storage and retrieval apparatus and system which has many unique features. By the use of roll film it is possible to store the images of a large number of documents on a relatively small amount of film. The system provided makes it possible to readily select the image to be viewed by the use of a microprocessor controller. By use of multiple sensors, it is possible to precisely position the film so that the scanning of the images can be readily accomplished. By converting the analog information obtained into a digitized output, it is possible to provide enhanced high quality images which can be readily displayed on high resolution cathode ray tubes or alternatively hard copy can be provided by use of electrostatic printers.

What is claimed is:

1. In a roll film document image storage and retrieval apparatus, a film transport having a supply reel and a takeup reel with a roll of film carried by the reels, the film having fiche spaced along the length of the film, each fiche being comprised of a plurality of images on the film arranged in columns and rows, means for driving the film along an x coordinate between the supply and takeup reels in forward and reverse directions, optical image sensing means disposed adjacent the film between the supply and takeup reels, the film having x coordinate indicia on the side margin of the film associated with the fiche and additional coordinate indicia on the side margin of the film associated with the columns of images, locating means for sensing the x coordinate indices for selecting the fiche and the column in the fiche having the specific image desired, means for causing relative movement between the optical image sensing means and the film along the y coordinate for selecting a row in the fiche so that a specific image carried by the film can be viewed, the image sensing means sensing a plurality of images simultaneously and providing an electrical output, and means for processing the electrical output to provide a visual image.

2. Apparatus as in claim 1 wherein the first named x coordinate indicia are in the form of a bar code on one side margin of the film and wherein the additional x coordinate indicia are in the form of cut marks on the other side margin of the film, and wherein said locating means includes bar code sensing means, and cut mark sensing means.

3. Apparatus as in claim 2 wherein said image locating mans for sensing a specific image on the film includes a Y-drive mechanism for causing movement of the optical image sensing means transversely of the film.

4. In a roll film document image storage and retrieval apparatus, a film transport having a supply reel and a takeup reel with a roll of film carried by the reels, the film having images thereon, the images formed on the film being formed in spaced apart fiche with the images in each fiche being formed in columns and rows, the fiche having identification in the form of a bar code associated with each fiche on one side margin of the film, the film having cut marks therein provided on the other side margin of the film to provide x coordinates for the fiche, the cut marks being associated with the spacing of the columns of images on the fiche, means for driving the film along an x coordinate between the supply and takeup reels in forward and reverse directions, optical image sensing means disposed adjacent the film between the supply and takeup reels, image locating means for causing relative movement along a y coordinate between the optical image sensing means and the film, said image locating means including bar code sensing means for sensing the bar code of the fiche and cut mark sensing means for sensing the cut marks on the fiche, the image locating means including a y drive mechanism, and y drive mechanism including means for sensing an initial position and means for thereafter determining the position of the y drive mechanism with reference to said initial position.

5. Apparatus as in claim 4 wherein said means for sensing initial positioning of the Y-drive mechanism includes a vane carried by a movable portion of the Y-drive mechanism and means for sensing the position of said vane and wherein the means for thereafter determining the position includes tachometer means driven by the Y-drive mechanism.

6. Apparatus as in claim 5 wherein said Y-drive mechanism includes a rotatable lead screw and wherein said tachometer means is rotated in accordance with the rotational position of the lead screw.

7. Apparatus as in claim 1 wherein said image sensing means includes a charge coupled device.

8. In a roll document image storage and retrieval apparatus, a film transport having a supply reel and a takeup reel with a roll of film carried by the reels, the film having images thereon, the images formed on the film being formed in spaced fiche with the images in each fiche being formed in columns and rows, the fiche having identification in the form of a bar code associated with each fiche on one side margin of the film, the film having cut marks provided on on the other side margin of the film to provide x coordinates for the fiche, the cut marks being associated with the spacing of the columns of images on the fiche, means for driving the film along an x coordinate between the supply and takeup reels in forward and reverse directions, optical image sensing means disposed adjacent the film between the supply and takeup reels, image locating means for causing relative movement along a y coordinate between the optical image sensing means and the film, said image locating means including bar code sensing means for sensing the bar code of the fiche and cut mark sensing means for sensing the cut marks for the fiche, the image locating means including a y drive mechanism, the cut mark sensing means including first and second cut mark sensors with one of the cut mark sensors being utilized to select the column and the other being utilized to help center the column 9. In a roll film document image and retrieval apparatus, a film transport having a supply reel and a takeup reel with a roll of film carried thereby the reels, the film having images thereon, the images being arranged in spaced fiche with the images in the fiche being arranged in columns and rows with the rows being arranged along a y coordinate and the columns being arranged along an x coordinate, fiche identification means in the form of a bar code carried by one side margin of the film and being associated with the fiche and cut marks carried by the other side margin of the film and being associated with the columns, bar code sensing means for sensing the bar code on the film as it is advanced, cut mark sensing means for sensing the cut marks on the film as the film is advanced.

10. Apparatus as in claim 11 together with optical image sensing means for sensing a plurality of images simultaneously and providing an electrical output and means for processing the electrical output to provide a visual image.

* * * * *